Aug. 23, 1949.  W. A. E. MITCHELL  2,480,040
AIRCRAFT CONTROL SURFACES
Filed Dec. 6, 1943  3 Sheets-Sheet 1

INVENTOR.
Wilbur A. E. Mitchell

Aug. 23, 1949. W. A. E. MITCHELL 2,480,040
AIRCRAFT CONTROL SURFACES
Filed Dec. 6, 1943 3 Sheets-Sheet 2
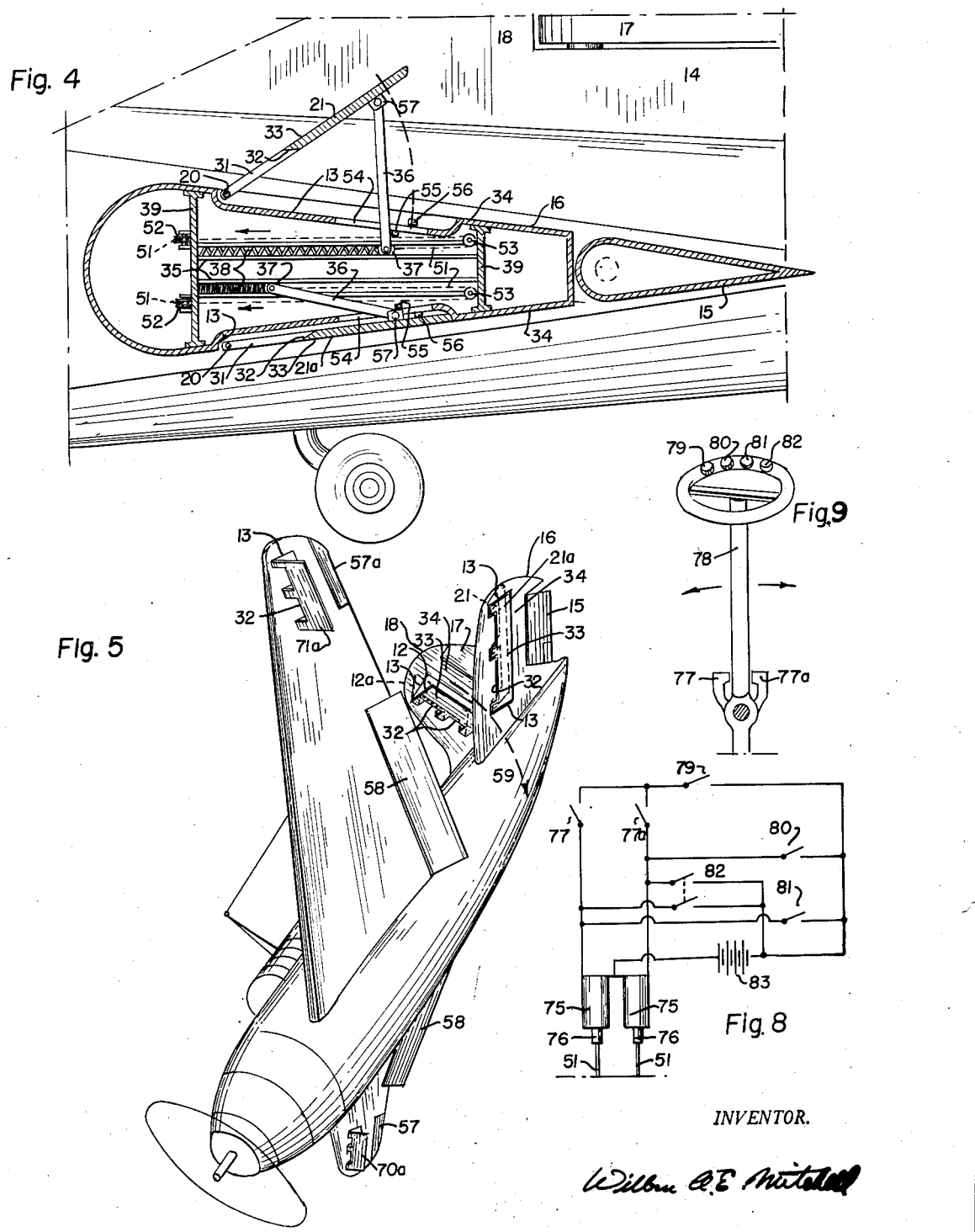
INVENTOR.
Wilbur A. E. Mitchell

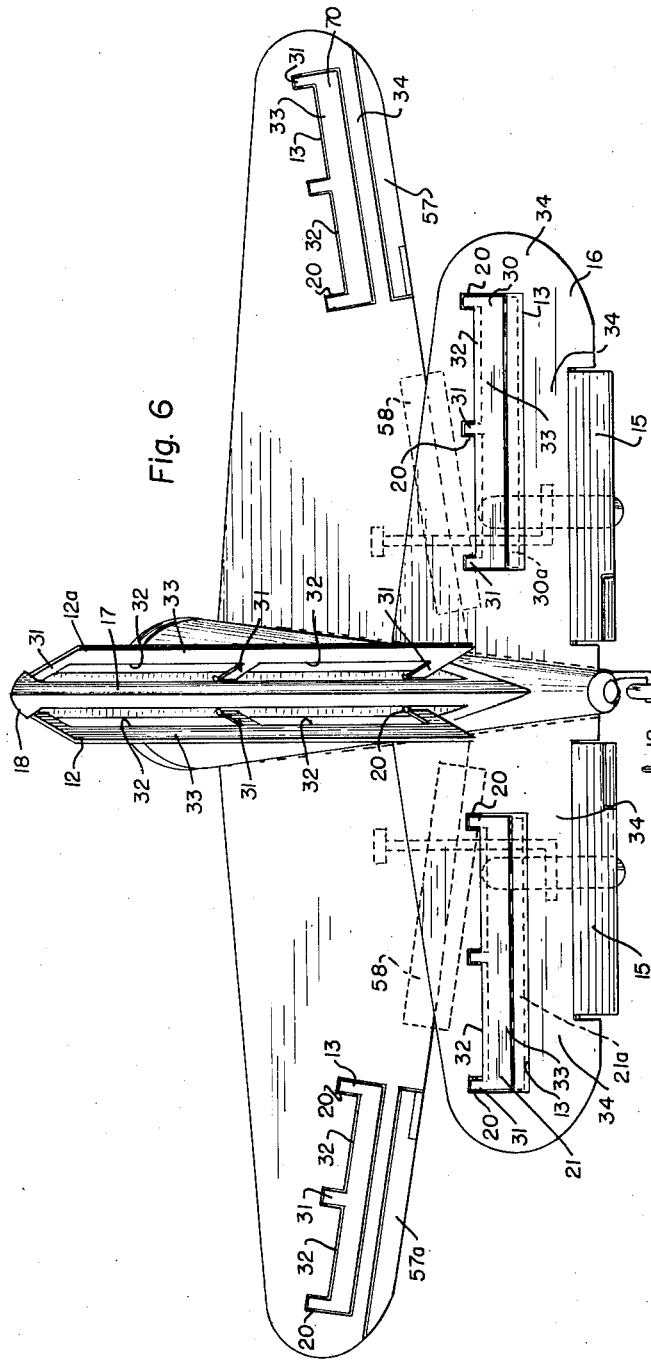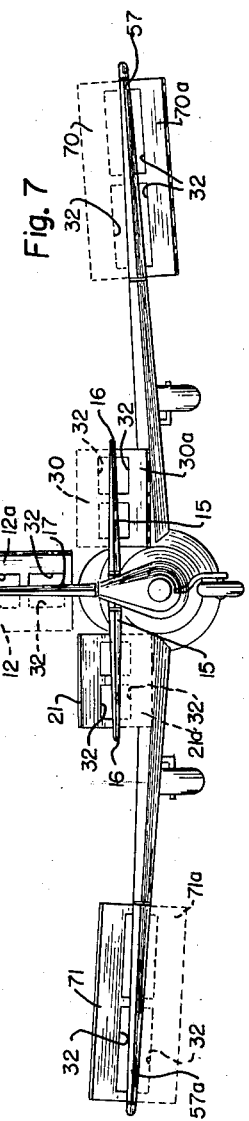

Patented Aug. 23, 1949

2,480,040

UNITED STATES PATENT OFFICE 2,480,040

AIRCRAFT CONTROL SURFACES

Wilbur A. E. Mitchell, Greeley, Colo.

Application December 6, 1943, Serial No. 513,112

4 Claims. (Cl. 244—87)

This invention relates to improvements in fluid or aircraft control surfaces; and more particularly to improvements in the controlling system for guiding aircraft, with reference to auxiliary control surfaces, to assist the usual control means, or, in the alternative, to be used in lieu of the usual control means.

In aircraft, rudders, elevators and ailerons are commonly used as guiding or controlling means. It occasionally happens that said usual control means become insufficient or inoperative, and disaster follows from inability to control the ship.

One of the principal objects of my invention, therefore, is to provide auxiliary control means which can be put into service at will, either to assist in controlling the craft, or sufficient to operate in lieu of either one or more of the usual rudder, elevator or aileron controlling means, in event any one, more or all of said usual controlling means becomes inoperative in flight without notice, for any reason.

It often happens that the usual landing flap, or airbrake means, preparatory to landing, is insufficient to slow the craft for a safe landing, and also that the wheel brake means upon landing is insufficient to stop the plane within the length of the runway, for some reason in either event, such as excess or sudden change of wind or direction, or excess weight of the craft. It is therefore another object of my invention to provide auxiliary control means for guiding the craft which can also be used at will as auxiliary means for braking the craft, either in the air or upon landing while running on the ground, by retarding its speed.

It occasionally occurs in certain types of aircraft designed and required to dive from an extreme altitude, such as in dive bombers and pursuit ships of a military class, that the air pressure upon the dive pull-out, on the usual elevator means for pulling the ship out of the dive, is so great that said elevator means are then insufficient or inoperative. It is, therefore, another object of my invention to provide auxiliary control means for controlling or guiding an aircraft, which will also constitute air-braking means, when desired, to retard the rate or speed of dive or fall of a bomber, pursuit ship or other craft, either by way of assisting the usual flap air-braking means, or act in lieu thereof, in the event same becomes damaged or inoperative.

It is a matter of common knowledge that one of the problems of aeronautics is to be able to raise large and heavy craft off of the ground in the take-off. It occasionally occurs that such craft are so bulky and heavy, proportionate to the motor-pull, wind resistance, construction of the craft and elevator means normally heretofore used, that difficulty, and sometimes disaster, results from inability to lift the craft off of the ground sufficiently before reaching the end of the runway upon the take off. It is, therefore, another object of my invention, in connection with my provision of auxiliary controlling or guiding means for aircraft, to so construct said auxiliary control means that same can be called into service at will to assist the usual elevator means raise the ship upon the take-off, or take the place thereof if the usual elevator means fails completely to operate.

Another object of my invention is to so construct aircraft with control surfaces to assist or take the place of the commonly used or usual rudder, elevator or aileron control surfaces, respectively, that the assisting surfaces can, if desired, be placed forwardly of the assisted surfaces or usual rudder, elevator and ailerons; I accomplish this by constructing each assisting surface with a cut-away portion, whereby in operation thereof the following usual control surface will continue to receive a quantity or blast of air against its surface upon operation of both assisting and usual surfaces, as a result of the said cut-away portion of the assisting surfaces permitting a blast of air to pass through the assisting surface upon use, and thereby not preventing normal successful operation of the usual surfaces at the same time.

More particularly, it is the object of my invention to provide auxiliary control means in co-operation with usual control means, whereby each auxiliary control means is operable independently and separate from each other and from the usual control means, without interfering with the wind pressure normally against the usual means for successful operation thereof, whereby one can operate in conjunction with another for greater maneuverability of the craft or against that other for assisting in air-braking the speed of the craft.

Another object of my invention is to provide a control surface for guiding an airplane which permits a portion of the wind pressure built up in front of it, upon operation, to pass through it, without interfering with the successful operation thereof and as well without interfering with the successful operation of any part of the plane following in said line of wind pressure.

Another object of my invention is to provide auxiliary rudder and elevator control means for aircraft, so constructed, in parts on each side of the rudder for movement, to also act as auxiliary aileron means, to assist the craft's ailerons, in the alternative, when desired.

With the above and further objects in view, it is to be understood that variations and changes may be made in the several forms of my invention shown herewith without going outside of the scope of the appended claims. For instance, I have illustrated my auxiliary elevator control means as being part of the tail assembly of an airplane; it is to be noted, however, that my said elevator controls could also be adapted with relation to the front wing of a plane as well as to the tail stabilizer portion, in event of a one wing plane without a separate stabilizer as now used.

Several forms which the present invention may assume are shown for illustrative purposes in the accompanying drawings, in which.

Figure 1:
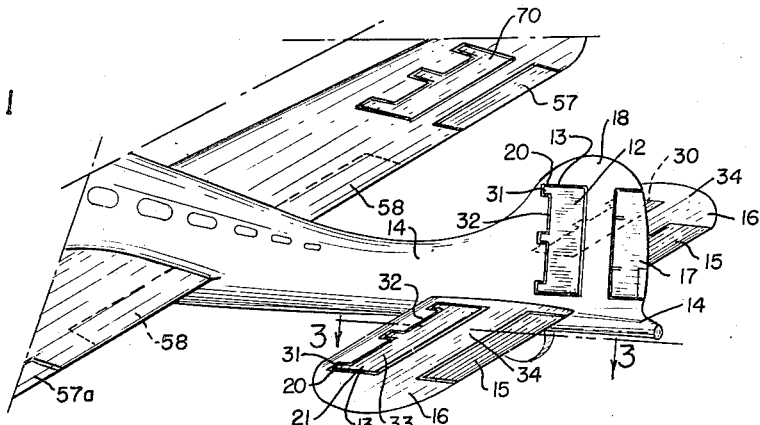
Figure 1 is a partial perspective view, looking downwardly upon the tail of a transport airplane, on the ground, having my auxiliary control means in association with the dorsal fin, stabilizer and front wings.
Figure 2:
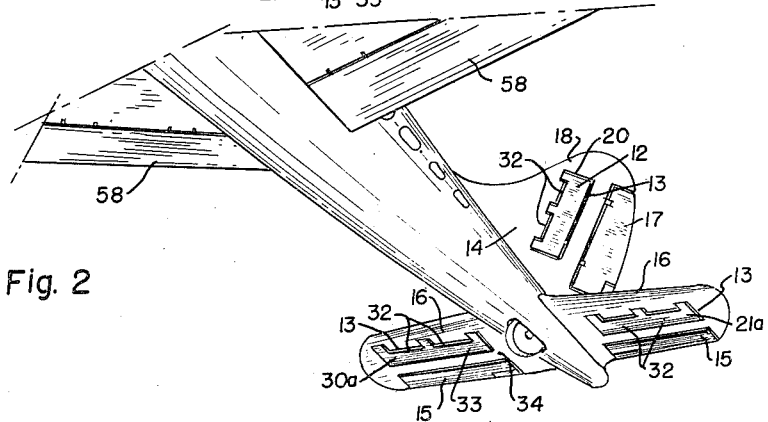
Figure 2 is a partial perspective view, looking upwardly at the tail of a transport plane in flight, having my stabilizer control means in association with the dorsal fin and stabilizer.
Figure 3:
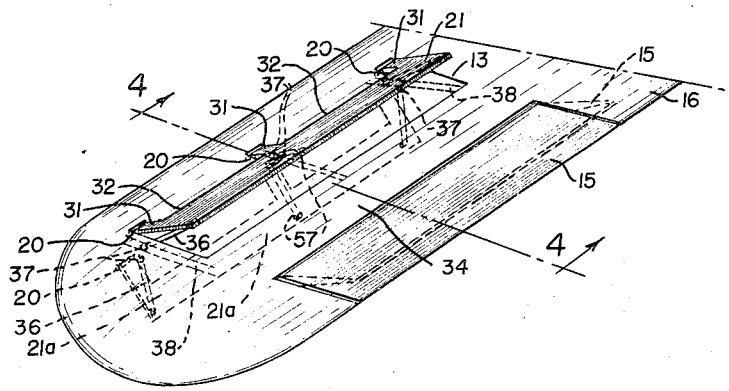
Figure 3 is an enlarged, partial perspective view of one side of the stabilizer, as indicated by the lines 3—3 of Figure 1.

Figure 4 is an enlarged, cross-sectional view, taken upon the line 4—4 of Figure 3, of a sample construction of one of my auxiliary control flaps, said view illustrating them in association with the stabilizer. This is to be taken as illustrative, also, of the construction of my said flaps shown in association with the dorsal fin and the front wings, as separate illustration thereof would be duplication.

Figure 5 is an elevational perspective view illustrative of a dive bomber or pursuit ship, in a power dive, wherein my auxiliary control means 12 and 12a, 21 and 30, and 70a and 71a, in the upper sides of the stabilizers, and in the dorsal fin and in the front wings, respectively, are, in operative position for assisting in air-braking the descent of the craft, in cooperation with the usual landing flaps 58 and usual elevators 15, and in levelling the craft out of the dive.

Figure 6 is a rear elevational view of the plane shown in Figure 5, after it has landed, showing my auxiliary rudder controls 12 and 12a in airbraking position, as an example, in cooperation with elevators 15, landing flaps 58 and the usual wheel brakes, for braking the speed of the plane after it has landed and is coasting on the runway.

Figure 7 is a diagrammatic representation of the relative operations of my ten different auxiliary control flaps or means, of the plane of Figure 6, looking rearwardly from the back, as will be explained.

Figure 8 is a diagram of one of my electrical circuits, forming the basis for others, used for operating certain of my auxiliary control surfaces; and Figure 9 is a diagrammatical illustration of a portion of the steering mechanism of an aeroplane, with certain switches associated therewith for controlling the operation of my auxiliary flap surfaces.

Referring now, more particularly to the drawings, the present invention comprises a set of auxiliary control flaps, or means, 12, 12a, 21, 21a, 30 and 30a, placed flush in recesses or indentations 13, in the tail assembly 14 of an aircraft. 15 are the usual elevator means in the stabilizers 16. 17 is the usual rudder means in the dorsal fin 18 of a plane. I also provide a similar structure in the front wings, in the form of auxiliary control flaps or means 71, 71a and 70 and 70a, as will be later explained. Each set of flaps 12, 12a, 21, 21a, 30, 30a, 71, 71a, 70, and 70a are of the same design, operation and construction, each being hinged on a fixed pivot 20, at the forward arm portion 31 of the flap, for pivotal movement away from the surface in which recessed at 13, as indicated by the dotted arrows of Figure 4.

Looking forwardly from the rear of the plane, flap or auxiliary control means 12 is pivotally mounted at 20, flush in recess 13, on the left side of the dorsal fin 18, spaced forwardly of the rudder 17. Similarly, on the right side of that dorsal fin I so construct and mount another identical such auxiliary control rudder flap or means 12a, each mounted for separate movement on opposite sides of said fin, as illustrated; that is, flap 12 is designed for operation on its forward pivot 20 outwardly from and on the left side of fin 18, whereas flap 12a is designed for such operation on its forward pivot 20 outwardly from but on the right side of said fin 18. Figure 4 illustrates such identical construction with relation, however, to one of the stabilizers. Since the structure of the fin 18, with relation to my flaps 12 and 12a, is the same as stabilizer 16, and flaps 21 and 30 and 21a and 30a, I have not felt it necessary to duplicate the illustration. My flaps 21, 21a and 30 and 30a comprise my auxiliary control elevator means.

Similar in construction, and manner of operation of flaps, are my pairs of auxilary aileron control flaps, 70, 70a and 71 and 71a, in the front wings, illustrated in Figures 5 and 6. It would be needless duplication to illustrate or explain them in detail, as they are the same as flap 20 of Figure 3, being designed, pivoted, placed and operated with relation to each other and the usual aileron control, 57 and 57a just as 20, 20a and 30, and 30a are, with relation to elevators 15. Usual ailerons 57 and 57a are fixedly operable in opposition to each other—that is, one up and the other down, only—whereas, my auxiliary ailerons are not so limited. 71 can be operated to go up only when 70a goes down, and 70 up only when 71a goes down, when desired, but they can also be operated in any other manner; for instance, to assist the elevators, for example in heavily loaded planes, 71a and 70a can each be lowered a sufficient amount to cooperate with the elevators in raising the craft, by acting as skids for raising when lowered to the right angle; and similarly for air-braking and bringing a craft out of a dive 71a and 70a can be lowered; also, if desired, to airbrake the speed of a craft 71 and 71a can be operated in opposition to each other, together with 70 and 70a also being operated in opposition to each other, thereby creating air resistance brakeage means when said auxiliary aileron control means are so used.

Auxiliary control elevator flaps 30 and 30a are constructed and operated the same as the ones in corresponding position on the other side of the rudder, 21 and 21a illustrated in Figure 4, 21 and 30 being on the top side of the elevator and 21a and 30a being on the bottom side thereof, looking forwardly from the tail, each in recesses 13 flush with the adjacent surface, and each pivotally mounted at the forward portion or arms thereof 20, for pivotal movement away from its respective surface.

Each of my auxiliary control flaps 12, 12a, 21, 21a, 30, 30a, 71, 71a, 70 and 70a have a forward portion, 32 thereof, Figure 4, adjacent the hinge 20 cut-away to provide space so that upon the flap being pivoted upon its axis 20, away from its corresponding surface 34, as in Figure 3, there is then a space 32, forward thereof, between the blade portion 33 of the flap and the corresponding surface 34. This structure in my aircraft flap or control or guiding means, is of utmost importance, as it permits an air pressure, or blast of air, to pass through that space 32, upon operation of my flap upon its pivot 20, adjacent and along the corresponding surface 34, without deflecting all the air away from that surface 34, as in Figure 3, thereby permitting usual normal operation of the following control surface placed behind it, such as the usual elevator 15 of Figure 3. This is true of each of my auxiliary control flaps or guiding means, so as to permit, rather than hinder, normal operation of usual rudder 17 and ailerons 57 and 57a. This cut-away portion or space 32 is the thing which permits placing one control means ahead of another, such as 21 ahead of 15, without sacrificing the operating efficiency of the following one. Taking the auxiliary means 21 as example, the space 32 of 21 permits air pressure or a blast of wind to pass through there, upon pivotal operation of 21, adjacent the surface 34, to strike elevator 15, and as a result the operation of 21 will not prevent or hinder the operation of 15 in any way. This placing, of my auxiliary control means on the same surface and ahead of the usual control means, is made possible by my said construction of my auxiliary control means, whereby my auxiliary control means can be brought into use at will to assist or take the place of the usual control means by utilizing the same air pressure or blast of air along that same surface, as a result of space 32.

Referring now to Figures 3 and 4, for the balance of a sample construction of my auxiliary control means or flap, my auxiliary controls are pivotally mounted at 20 and seated in a recess 13 flush with the adjacent surface 34. The inside of the recessed portion 13 of the stabilizer is closed except for slots 54 through which the flap is connected to a source of power. When power to pivot away from its seat or surface is not applied, the flap is normally held in its recess by means of spring 38, as shown with relation to flap 21a of Figure 4. Spring 38 connects the flap 21a to the source of power through arm 36, pivotally mounted in a roller 37 held in a U-shaped stationary guide rail 35 mounted between support beams 39 of the stabilizer structure. The other end of arm 36 is pivotally mounted at 57. Wire 51 connects the source of power to the flaps by passing over rollers 52 and 53 and being connected with the inward edges of arms 36 adjacent the axes of the rollers 37, whereby the flaps can be operated separately or in unison, as desired. Each conduction of power from the source is separate from the other, so that either or both of the corresponding member comprising the pair of auxiliary flaps, 21 or 21a, can be operated when desired; and this is true with relation of each pair of my other auxiliary control flaps, 30, 30a, 12, 12a, 70, 70a, 71 and 71a, with relation to each member thereof comprising the pair. When the power is applied through the cable 51, in the directions indicated by the small arrows adjacent the springs of Figure 4, to operate the flap 21, for instance, the arm 36 is pulled towards the stop 55 against the spring 38 attached to the roller 37 in track 35, and as a result the arm 36 pivotally mounted at both of its extremities pushes the flap 21 portion 33 thereof, on its axis 20, away from its corresponding surface 34, whereby the portion 33 is the desired space away from its adjacent surface 34 to provide the proper air pressure stress against that surface 34 for the desired auxiliary or only control means action at that place. The amount of power or pressure exerted through cable 51 controls how much space the portion 33 of the flap is operated away from its adjacent surface 34. Upon release of the pressure, through cable 51, the spring 38 quickly brings the flap back to inoperative position flush with its adjacent surface 34, in recess 13, and holds it there assisted by the air pressure in flight. Recess 13 is completely closed from the outside, but for the slot 54 in which the arm 36 operates. 55 is a fixed maximum operable stop for the arm 36. 56 is a fixed stop for the flap 21 to rest against, being held there when not in use by the spring pressure and the pressure of the air in flight. Front edge of the portion 33 is at an angle to arm 31 as illustrated to prevent wind resistance building up against it upon use of the flap, and similarly with the trailing edge 57.

It is to be noted, in the embodiment of my invention illustrated, that my invention comprises a new kind of aircraft control flap or guiding means. I mount 5 pairs, or 10 of them, at five different places in the craft, for 10 independent controls or guiding means, if desired, each ahead of the usual rudder, elevator, and aileron control means; the elevators being one on each side of the rudder, and each pair comprising one on the upper surface and one on the lower surface. New uses and combinations of uses result from each of my said auxiliary, or main, control flaps or means being capable of operation independently of each other and of the usual controls of a craft as heretofore known; preferably, constructing my controls each with a cut-away portion to permit wind blast to pass therethrough, in operation, for use of the usual controls following, but I do not mean to limit my invention to such structure, as that is but one embodiment thereof, illustrated.

One method of operational connections for my control flaps or means is to so connect the cables 51, being the same construction as in Figure 4, to the sources of power, whereby my rudder 12a will operate on its pivot when and as rudder 17 is moved to the right, proportionately thereto, and so that my rudder 12 will operate proportionately on its pivot when and as rudder 17 is moved to the left; and so that my elevator 21 will operate proportionately on its pivot upwardly when and as elevator 15 is moved upwardly, and so that my elevator 21a is moved proportionately downwardly when and as elevator 15 is moved downwardly; and whereby my elevator 30 moves upwardly proportionately on its pivot when elevator 15 moves upwardly, and so that my elevator 30a moves downwardly on its pivot proportionately when and as elevator 15 is moved downwardly; at the same time in the alternative, at the will of the pilot, another method of operational connection of my controls is to have them connected for individual or any desired combination of movement. My flaps 70, 70a, 71 and 71a, are to be similarly connected, with relation to the usual ailerons 57 and 57a, as will be more fully explained. It will readily be seen that my auxiliary controls will assist the usual controls in guiding the aircraft, or in event of inoperativeness of any one of the usual controls my corresponding auxiliary ones will take the place thereof in an emergency.

Various means may be utilized for operating my 10 auxiliary control surfaces, 71—70a, 70—71a, 12—12a, 21—30, and 21a—30a, independently, simultaneously with others, or in any other combinations, as well as a unit independently of the trailing edge controls, as will be explained, within the teaching of this invention. In Figures 8 and 9 of the drawings I illustrate one way of operating one set or type of my auxiliary controls, such as auxiliary ailerons 71—70a, and 70—71a. Similar sets of circuits and switches as therein shown are provided for each of my other types of controls, the basis of each being as illustrated, I will now explain the one illustrated in detail. It is to be understood, with relation to this illustration, and designed to operate all four ailerons 71—70a and 70—71a, that, for purpose of this illustration, a pair of ailerons, such as 71—70a are connected by any conventional system of cable and lever arrangement to one cable 51, of Figure 4, and the other pair of ailerons 70—71a are so connected with another cable 51, whereby actuation of one of said cables 51 will operate a pair of those ailerons, as will be understood in the art with relation to heretofore conventional trailing edge ailerons being operable in opposing directions as a unit. Said power cables 51 and 51, one of which is so connection with one of said pair of my auxiliary ailerons, 71—70a, for actuating same as a unit in unison, and the other of which cables 51 is so connected with the other of said pair of auxiliary ailerons, 70—71a, for actuating them as a unit in unison, for example in describing my power means and circuits, are reactive to solenoids 75, as illustrated in Figure 8, with each cable 51 being connected to an armature 76 of a solenoid 75. The circuits of those solenoids are connected to several switches, there being several circuits in parallel to operate independently. One pair of circuits contains switches 77 and 77a to alternately react with and in the same direction of operation of trailing edge ailerons 57 and 57a, the switches 77 and 77a being arranged on the conventional steering mechanism 78 to react alternatively as the pilot leans the stick sidewise to operate the conventional trailing edge ailerons 57a and 57. It will be seen therefrom that as the pilot leans the stick to the left, and in so doing raises the trailing edge aileron 57a and lowers trailing edge aileron 57, that my auxiliary ailerons 71 and 70a will be pivotally operated in unison in coaction with the movement of 57a and 57, by 71 being also raised and 70 also lowered; and as the stick is leaned sidewise to the right for actuating a raising of trailing edge aileron 57 and a lowering of trailing edge aileron 57a, that other of my auxiliary ailerons, 70 and 71a, will be pivotally operated in unison in coaction with that movement of 57 and 57a, by 70 being also raised and 71a being also lowered. A throwout switch 79, located on the steering handle mechanism, disconnects the circuits containing the switches 77 and 77a, for making the type of reaction just described inactive, as will be understood. Another pair of circuits contain the switches 80 and 81, adapted for selective operation of either pair of ailerons, 71 and 70a, or 71a and 70, independently of the trailing edge ailerons 57—57a, with the said switches, 80 and 81, being conveniently associated with the steering mechanism 78. Double switch 82 operates both solenoids 75, adapted for causing operation of both of my pairs of auxiliary aileron control surfaces, 71—70a, and 71a—70, simultaneously and independently of the trailing edge ailerons 57—57a, as for air-braking reasons, which will be more fully explained. Since my invention also provides for selective use or operation of one or more of my said four auxiliary aileron flaps, 71—71a—70—70a, for aileron use or other use reasons, as will be explained, therefore, obviously, in order to be able to so selectively operate any one of said four auxiliary control surfaces, 71, 71a, 70 or 70a, independently of all other control surfaces, other circuits are provided for each of my novel sets or types of control surfaces, wherein there are four such surfaces in number, as in the case of the auxiliary ailerons, just described, and likewise in the case of my four elevators, 21—21a—30—30a, as will be understood, by providing two more solenoids and two more selective switches and circuits in parallel, for thereby operating any one of such sets of four independently.

From the foregoing explanation of the power means and circuits used for operation of my auxiliary ailerons, it will be apparent that similar circuits and switches are provided for pivotal raising operation of my auxiliary elevators 21 and 30 as a pair in coaction with and upon operation of trailing edge elevators 15, as said elevators 15 are elevated, and for pivotal lowering operation of my auxiliary elevators 21a and 30a as a pair in coaction with and upon lowering operation of trailing edge elevator 15; and with the provision of four circuits, solenoids and sets of selective switches, adapted for selective independent operation of any one of my four auxiliary elevators 21, 21a, 30 or 30a, or any combination of those four, for reasons to be explained; it being understood, in connection therewith, that the switches 77a and 77 thereof, instead of being positioned sidewise of the stick, are, though not illustrated, obviously, positioned fore and aft of the stick, for those circuits simultaneously operating either an upper pair of my auxiliary controls as the trailing edge control is raised, or for simultaneously operating my lower pair of said controls as the trailing edge control is lowered, upon a movement of the stick aft or fore, respectively, when the simultaneously operable circuit is in use; without necessitating further illustration and description.

Further, from the foregoing detailed description, relative to the circuits and operation of my ailerons, 71—71a—70—70a, it will be apparent that the circuits shown in Figure 8 are also used for operating my auxiliary rudders 12 and 12a, except that I provide a two position, right and left contact, rotary switch, associated with the steering mechanism, instead of the switches 77 and 77a, whereby, when the wheel is turned to the left my auxiliary rudder 12 is pivoted from its surface in coaction with and upon the main trailing edge rudder 17 being turned to the left, as illustrated in Figures 6 and 7, and when the wheel is turned to the right my auxiliary rudder 12a is pivoted from its surface in coaction with and upon trailing edge rudder 17 being turned to the right. Selective and independent operation of my auxiliary rudders, 12 and 12a, is also provided in these circuits, as previously explained with relation to the circuits for my ailerons, two circuits, solenoids and selective switches, as illustrated in Figure 8, being sufficient in this instance with relation to my auxiliary rudders.

By providing a master switch to energize all solenoids of all three sets of circuits, just explained, obviously, and as will be understood, all ten of my auxiliary control surfaces, 71, 71a, 70 70a, 21, 21a, 30, 30a, 12 and 12a, may be operated as a unit, for air-braking means, as will be explained. Other circuits than those explained may, obviously, be provided for the operation of my ten auxiliary controls, in various methods and combinations, within the spirit and teaching of this invention. A battery, or other source of power, 83 furnishes power for the circuits. Instead of mounting the switches, as illustrated, they may be mounted on a panel on a side of the steering column. It is to be understood, as within the teaching of this invention, that instead of solenoids for actuating the cables 51, other suitable power means may be provided, such as electric motors, with reduction gears, circuits and switches, and that, suitable cut-off switch means may be provided therewith for controlling the amount of operation of each control surface, once started, in accordance with a selective determination therefor.

I will now explain some of the various new operational results or new uses from my said structural novelty and combinations.

The landing flaps of the average small airplane are sufficient to slow the speed of the plane for a safe landing. With larger, heavier and faster aircraft, however, it has been found that the matter of slowing the craft sufficiently for a safe landing needs improvement over the heretofore conventional means used to accomplish that, if it is not one of the most serious problems of aviation. In aircraft having my auxiliary flaps that problem is not present. Reference is made to my Figures 5 and 6. Preparatory to landing, one or more of my flaps is pivotally raised away from its corresponding surface, sufficiently to form air pressure resistance thereagainst, in cooperation with the usual elevator means so as to keep the craft on the desired degree of descent; as illustrated in Figure 5; wherein my auxiliary ailerons 70a and 71a, auxiliary rudders 12 and 12a and the upper auxiliary elevators 21 and 30 are pivotally extended, as illustrated, to assist the landing flaps 58 in air-braking the craft preparatory to landing, when also using the usual elevator in a downwardly position, illustrated in Figure 5. In such a combination just mentioned, it steadies the angle of descent by holding the tail upwardly against the downwardly thrust caused from the air friction against the flaps 12, 12a, 21 and 30 being extended, indicated by the dotted arrows of Figure 5; and in such a combination the said usual elevator means 15 has a new use, namely, that of braking or landing flap means. Pressure against my extended flaps 12, 12a, and 21 and 30 cause the plane to lower its tail; and pressure against the lowered usual elevators 15 cause the tail to be raised sufficiently to counteract the downward thrust just mentioned; thereby creating a new and effective air-braking means to assist the usual landing flaps, 58. The proportion of said extension of my new flaps and of the elevators, just mentioned, with relation to each other, can easily be determined in advance with relation to the individual plane, so as to have a normal level, yet downward, glide for landing when desired. In extremely heavy planes this will be found to be sufficient air-braking means, in cooperation with the usual landing flap braking means, that the craft will not have to circle the field several times to lose speed before landing, but will be able to come in from a high altitude for a straight descent when desired. Advantages of this structure for use in a bomber or pursuit ship will be obvious. My invention results, from the use just described, in the entire tail assembly of a craft becoming, in effect, braking means for the craft when desired in the air, as well as after the plane has landed, as illustrated further in Figure 6; which shows a plane having just landed wherein tail braking means just mentioned comprise my auxiliary rudders 12 and 12a, being extended, my auxiliary elevators 21 and 30, being pivotally extended upwardly from the stabilizer, in conjunction with the lowered usual elevators 15 and the lowered landing flaps 58, all creating air-brakeage and thus assisting the wheel brakes in stopping the plane upon the landing run stop before it reaches the end of the runway. Of course, in extreme cases or with extra heavy or fast craft, more air-braking could also be had by also extending my upper and lower pairs of auxiliary aileron flaps, 71 and 70, and 71a and 70a; either alone or in combination with the other braking means mentioned. It is also obvious from my disclosures thus far, that my lower auxiliary elevator flaps 21a and 30a can also be brought into play for air-braking means in cooperation with the air-braking means, 21 and 30, 12 and 12a, and elevators 15, illustrated and just explained, truly making the tail assembly a braking means when so used.

Pursuit ships and dive bombers necessarily have to dive under power and attain terrific speeds, with the result that difficulty in raising the usual elevators 15, for pulling the craft out of the dive or fall, is experienced. Under such circumstances, the use of my auxiliary control flaps, or elevator means 21 and 30 being pivoted or spaced away from their corresponding surface, will greatly help the usual elevators 15 pull the plane out of the dive and level it at the desired degree. As previously mentioned, my auxiliary rudders 12 and 12a, when opposingly to each other extended in flight tend and do force the tail downwardly; so in the situation just mentioned of bringing a plane out of a dive, they also could be so used as speed braking and tail lowering means for leveling the craft if necessary, in cooperation with the usual elevators and my new auxiliary elevators.

It will be obvious, that one of the functions or new uses of my auxiliary elevators or means for raising the craft, is to raise the upper elevators 21 and 30 to assist the usual elevators 15, upon a take off, in the event of a heavy craft or load, to prevent the plane overrunning the runway. Such a use will also be of value to the pursuit ship, for a quick climb preparatory to a backward up-side-down reversal to get behind an adversary before he realizes it. Speed is essential; so also is maneuverability; and my auxiliary control flaps or means provide safety and utmost maneuverability.

In the prior art, ailerons are fixed for operation, with relation to each other, so that when the one goes down the other goes up. As previously explained, my auxiliary ailerons 70, 70a and 71, 71a are not so limited, but can have independent movement. It is also to be noted that my auxiliary control elevators 21 and 21a, and 30 and 30a, capable of movement also independently of one another, could as a result, if needed, assist the usual ailerons, by pressure exerted through the tail structure, as diagrammatically illustrated by the solid line position of my auxiliary elevators 21 and 30a, of my Figure 7.

Should the rudder 17 be insufficient to left turn the airplane, or other craft, my auxiliary rudder 12 can then be brought into operation, by being pivoted outwardly from its corresponding surface enough to cause the desired left turn; and similarly, should the rudder 17 fail on a right turn, the auxiliary rudder 12a can then be pivoted outwardly enough to cause the desired right turn. As mentioned, the auxiliary elevators 21 and 30 can be used to assist the usual elevators 15 in take-off or ascent. Likewise, my auxiliary lower elevators can be brought into use to assist the elevators 15, if necessary, control the degree or speed of descent desired.

My auxiliary controls 12, 12a, 21, 21a, 30, 30a, 70, 70a, 71 and 71a, are not required to be moved in pairs, or in unison, or in any particular set of combinations or relationship, but are mounted for movement of any one or more independently of the remainder. For instance, to bank and turn the plane to the left by means of my auxiliary controls, without using the usual controls, my 12, 70a, 30a, 21 and 71 could be pivoted away from the corresponding surface of each (see Figure 7); and then reverse movement could be used by using 12a, 70, 30, 21, and 71 by pivoting each away from its corresponding surface, to reverse the action; or such entire combination need not be used if not necessary, such as the same result in less degree could be accomplished by using either 12 and 21 or 12a and 30, respectively. It will thus be clearly seen that my auxiliary controls are not only auxiliary controls for steering or guiding the craft, but also for braking, assisting and supplementing any one or more the heretofore known means for controlling or guiding, and also braking, respectively.

Other numerous benefits and uses from my construction will be at once apparent. Particularly, greater maneuverability of military craft and greater safety of civilian transports of tomorrow will result. The future is expected to have tailless planes, in the way we have used them in the past—that is, aircraft with only one large wing, with control means in connection therewith, instead of the conventional plane of today, and it appears that the motors will be placed in the rear. Such future construction will make "edge-flaps, ailerons, rudders and elevators" difficult of construction and operation. I do not wish to be confined in my invention to today's conventional craft. All of my auxiliary controls herein set forth, illustrated and explained, can just as well be placed in the surfaces of a one-wing plane, permitting motors to be placed at the edges thereof, and present usual "edge" control means eliminated.

While I have thus disclosed and described several preferred embodiments of my invention, it is apparent that many variations and changes may be made therein without varying from or distinguishing over the spirit and scope of my invention.

Moreover, all of the features of my invention need not be used conjointly, as the same may be used to advantage in variously different combinations and sub-combinations. I therefore wish to be limited only by the accompanying appended claims.

Having thus described my invention, what I claim as new and desire to cover by Letters Patent is:

1. In an aircraft, in combination, an airfoil having a control element pivoted thereto at its trailing edge and swingable in opposite directions, a pair of like auxiliary control elements adapted for the same type of control as the trailing edge control and being each pivoted to said airfoil and one on each side thereof in front of said first control element and each with a cut-away portion adjacent its pivot, each auxiliary control element being pivoted at its forward edge, one of said auxiliary control elements being operably swingable in one direction away from said airfoil and the other auxiliary element being operably swingable in the other direction therefrom, and means for independently operating said auxiliary controls, whereby in the flight of the aircraft so when an auxiliary control element is swingably operated away from its adjacent airfoil surface a part of the airstream passes through said cut-away portion and between the auxiliary control element and its adjacent airfoil surface to said first control element.

2. In an aircraft having air-brakeage means, in combination, an airfoil having a control element pivoted thereto at its trailing edge and swingable in opposite directions from a centrally substantially streamlined position, a pair of like auxiliary control elements adapted for the same type of control as the trailing edge control and being each pivoted to said airfoil and one on each side thereof in front of said trailing edge control element and each having a cut-away portion adjacent its pivot, each auxiliary control element being pivoted at its forward edge, one of said auxiliary control elements being swingable away from said airfoil in one direction and the other being swingable in the other direction, and means for simultaneously operating said auxiliary control elements, whereby in flight of the aircraft when said auxiliary control elements are so simultaneously operated a part of the airstream passes through each cut-away portion and between its respective auxiliary element and adjacent airfoil surface to said first control element.

3. In an aircraft, in combination, an airfoil having a control element pivoted at the trailing edge of the airfoil and swingable in opposite directions, a pair of like auxiliary control elements adapted for the same type of control as the trailing edge control and being each pivoted at its forward edge to said airfoil in front of said trailing edge control element, each auxiliary control element having a cut-away portion adjacent its pivot, one of said auxiliary control elements being operably swingable in one direction away from said airfoil and the other auxiliary element being operably swingable in the other direction therefrom, and means for simultaneously operating one of said auxiliary control elements and said trailing edge control element, whereby in flight of the aircraft when an auxiliary control element and the trailing edge control element are so simultaneously operated a part of the airstream passes through said cut-away portion of said auxiliary control element and between said auxiliary control element and its adjacent airfoil surface to said trailing edge control element.

4. In an aircraft, the combination with an airfoil having upper and lower surfaces, a leading edge, and a trailing edge having an operative means associated therewith adapted for operation in the air-stream, of aircraft guide control means comprising a pair of guide control elements, each guide control element being pivotally mounted at its forward edge to said airfoil, one of said guide control elements being positioned on each side of the airfoil in front of said trailing edge means, and each guide control element having a cut-away portion adjacent its pivot, one of said guide control elements being swingably operable away from said airfoil in one direction and the other of said guide control elements being swingably operable away from said airfoil in the other direction, means for swingably operating each guide control element on its pivot independently of the other guide control element, and alternative means for swingably operating both of said guide control elements simultaneously in unison on their pivots, whereby in flight of the aircraft when a guide control element is pivotally operated a part of the airstream passes through said cut-away portion and between said guide control element and its adjacent airfoil surface to said trailing edge operative means.

WILBUR A. E. MITCHELL.

REFERENCES CITED

The following references are of record in the file of this patent:

| Number | Name | Date |
|---|---|---|
| 1,056,844 | Simpson | Mar. 25, 1913 |
| 1,153,612 | Erie | Sept. 14, 1915 |
| 1,707,690 | Sperry | Apr. 2, 1929 |
| 1,841,804 | Hall | Jan. 19, 1932 |
| 2,043,275 | Weick | June 9, 1936 |
| 2,045,638 | Dormoy | June 30, 1936 |
| 2,064,970 | Dornier | Dec. 22, 1936 |
| 2,115,225 | Zaparka | Apr. 26, 1938 |
| 2,158,686 | Barnhart | May 16, 1939 |
| 2,170,787 | Rose | Aug. 22, 1939 |
| 2,194,796 | Joyce | Mar. 26, 1940 |
| 2,207,951 | Stone | July 16, 1940 |
| 2,322,745 | Rogallo | June 29, 1943 |
| 2,329,177 | Baker | Sept. 14, 1943 |
| 2,381,957 | Ibarra | Aug. 14, 1945 |
| 2,395,809 | Goddard | Mar. 5, 1946 |

FOREIGN PATENTS

| Number | Country | Date |
|---|---|---|
| 167,260 | Great Britain | Aug. 3, 1921 |
| 365,537 | Great Britain | Jan. 18, 1932 |
| 448,827 | Great Britain | June 16, 1936 |
| 785,934 | France | May 27, 1935 |

Certificate of Correction

Patent No. 2,480,040

August 23, 1949

WILBUR A. E. MITCHELL

It is hereby certified that errors appear in the printed specification of the above numbered patent requiring correction as follows:

Column 3, line 61, for the word "rearwardly" read *forwardly*; column 7, line 35, for "connection" read *connected*; column 9, line 7, after "70" insert a comma; line 10, after "circuits" insert a comma; column 12, line 19, before "operating" insert *so*; line 20, after "aircraft" strike out "so";

and that the said Letters Patent should be read with these corrections therein that the same may conform to the record of the case in the Patent Office.

Signed and sealed this 20th day of December, A. D. 1949.

[SEAL]

THOMAS F. MURPHY,
*Assistant Commissioner of Patents.*